Aug. 18, 1959     T. LAZUR     2,900,153
ADJUSTABLE FISHING ROD
Filed May 2, 1957
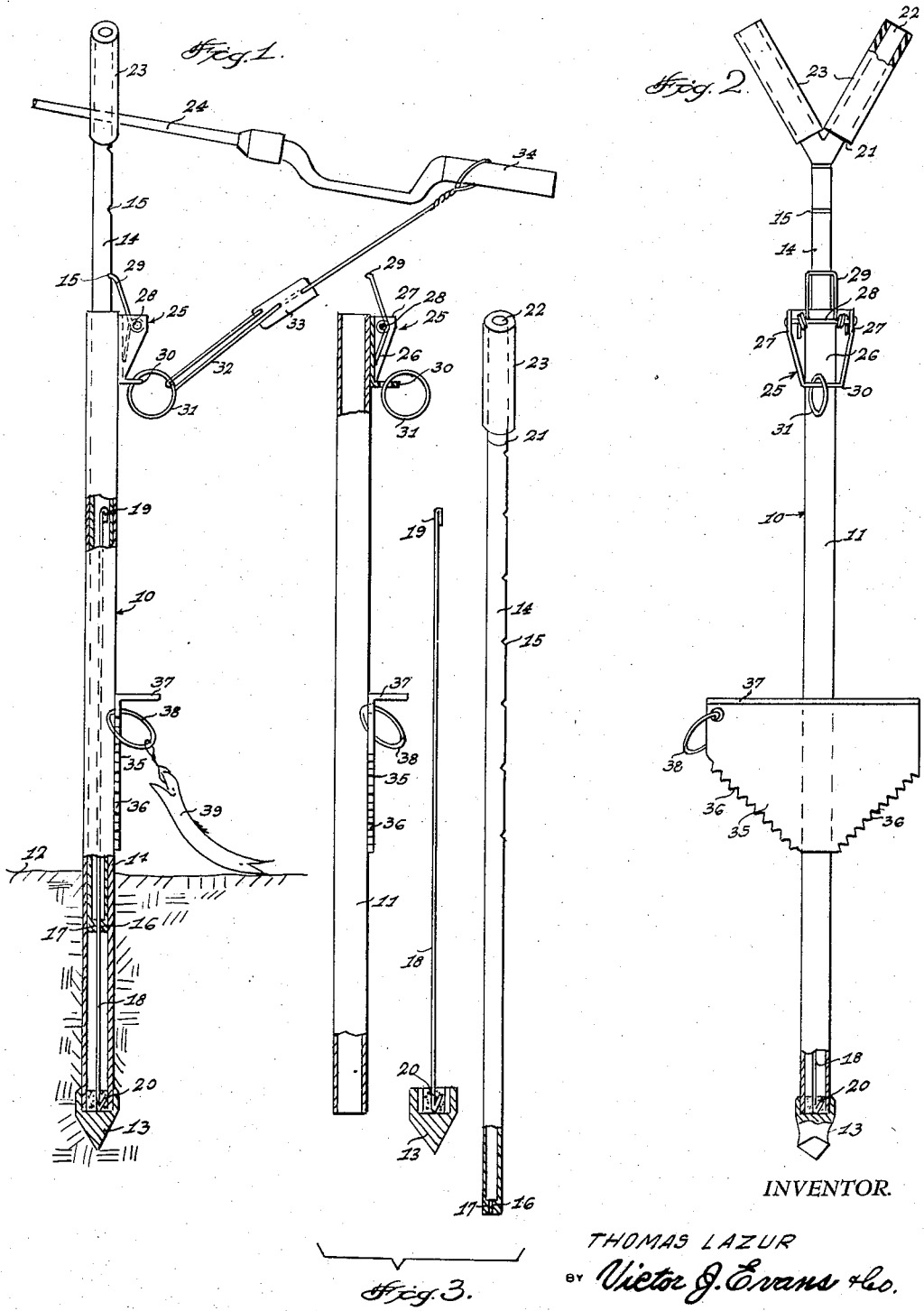
INVENTOR.
THOMAS LAZUR
BY Victor J. Evans & Co.
ATTORNEYS

United States Patent Office 2,900,153
Patented Aug. 18, 1959

2,900,153

ADJUSTABLE FISHING ROD

Thomas Lazur, Tamaqua, Pa.

Application May 2, 1957, Serial No. 656,601

3 Claims. (Cl. 248—44)

This invention relates to a fishing rod, and more particularly to a support for a fishing rod.

The object of the invention is to provide a device which is adapted to be used for conveniently supporting a fishing rod or fishing pole.

Another object of the invention is to provide a device for use in supporting a fishing rod whereby it is not necessary for the fisherman to hold the fishing rod in his hands, the fishing rod support of the present invention being adjustable so that the fishing rod can be supported at different positions or elevations, and wherein the present invention further includes a means for conveniently supporting fish which have been caught.

A further object of the invention is to provide an adjustable fishing rod support which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a side elevational view showing the fishing rod support of the present invention being used, and with parts broken away and in section.

Figure 2 is a view taken at right angles to the view shown in Figure 1, and with parts broken away and in section.

Figure 3 is a fragmentary sectional view showing the parts of the fishing rod support disassembled.

Referring in detail to the drawings, the numeral 10 indicates the adjustable fishing rod support of the present invention, and the support 10 includes a vertically disposed standard 11 which is adapted to be projected down into the ground 12, Figure 1. A pointed or tapered tip 13 is secured to the lower end of the standard 11 in any suitable manner, as for example by welding, and the pointed tip 13 facilitates the placement of the standard 11 into the ground 12.

The adjustable holder 10 further includes a rod 14 which is slidably or adjustably mounted in the standard 11, and the rod 14 is provided with a plurality of spaced apart notches 15. A bushing 16 is secured within the lower end of the rod 14, and the bushing 16 is provided with an opening 17 therein. An elongated body member 18 has a stop member 19 on its upper end for engagement with the bushing 16 so as to prevent the rod 14 from moving all the way out of the standard 11. The lower end 20 of the body member 18 is secured to the tip 13 in any suitable manner, as for example by welding.

Mounted on the upper end of the rod 14 or secured thereto is a fork 21 which is shaped to define a pair of angularly arranged legs 22. A suitable covering 23 of yieldable material may be arranged on each of the legs 22 so as to prevent the fishing rod 24 from becoming scratched or otherwise damaged.

The holder or support of the present invention further includes a bracket 25 which has a back portion 26 secured as by welding in the upper end of the standard 11. The bracket 25 further includes a pair of spaced apart flanges 27 which support a pin 28, and a spring member 29 is mounted on the pin 28. The spring member 29 is mounted for movement into and out of engagement with the notches 15 whereby the rod 14 will be maintained immobile in its various adjusted positions. Extending outwardly from the lower end of the bracket 25 is an apertured ear 30, and a ring 31 is connected to the ear 30. A cable 32 has a portion thereof connected to the ring 31, and the cable 32 is provided with an adjustable clamp 33, a portion of the cable 32 being arranged in engagement with a handle 34 which forms part of the fishing rod 24.

Secured to the standard 11 in any suitable manner, as for example by welding, is a plate 35 which includes side edges that are provided with teeth 36 that are adapted to be used for scaling fish. A lip or flange 37 is secured to the upper edge of the plate 35 so that a person can readily step on the flange 37 so as to help move the tip 13 down into the ground 12. A ring 38 is connected to the plate 35, and the ring 38 can be used for holding fish 39 which have been caught.

From the foregoing, it is apparent that there has been provided a support which is adapted to be used for holding or conveniently supporting a fishing rod such as the fishing rod 24. In use, with the parts arranged as shown in the drawing, the pointed tip 13 is adapted to be projected down into the ground 12, and this can be accomplished by stepping on the flange 37 which is arranged on the upper end of the plate 35. Thus, by exerting sufficient foot pressure on the flange 37, the pointed tip 13 will be driven down into the ground so that the lower portion of the standard 11 will be conveniently supported in the ground. Then, the spring member 29 can be manually moved out of engagement with the particular notch 15 which it engages whereby the rod 14 can be readily moved up or down in the standard 11 so that the fork 21 can be positioned at the desired height. When the rod 14 has been moved to the desired location, pressure on the spring member 29 can be released whereby the spring member will engage one of the notches 15 so as to maintain the rod 14 immobile in its adjusted position whereby accidental movement or shifting of the rod 14 will be prevented. The fishing rod 24 projects through the fork 21, and the handle 34 of the fishing rod 24 is engaged by a portion of the cable 32. The effective length of the cable 32 can be varied or regulated by means of the adjustable clamp 33, and the cable 32 is connected to the ring 31 which is mounted on the lower portion of the bracket 25. The bracket 25 provides a support for the spring member 29, and the bracket 25 is secured as by welding to the upper end of the standard 11. The bracket 25 also supports the ring 31. There is further provided the body member 18 which has the stop member 19 on its upper end that is adapted to be engaged by the bushing 16 on the lower end of the rod 14 so as to prevent the rod 14 from being raised too high and all the way out of the standard 11. The lower end of the body member 18 is anchored to the tip 13 or to the lower end of the standard 11. The teeth or serrations 36 on the plate 35 can be used in scaling fish which have been caught. The ring 38 can be used as a convenient support for the fish 39 which have been caught.

The parts can be made of any suitable material and in different shapes or sizes. The support of the present invention can be used for holding a fishing rod such as the rod 24 when the rod is being used for still fishing. Since the support is adjustable, the device can be adjusted so as to conform to the contour of the land. The rod 14 may be provided with scale markings for use in measuring the length of the fish.

The above description of the invention is for illustrative purposes only and it is understood that modifications may be made in the construction within the scope and spirit of the following claims.

I claim:

1. In an adjustable fishing rod support, a vertically disposed hollow standard, a pointed tip on the lower end of said standard, a hollow rod adjustably mounted in said standard, there being a plurality of spaced apart notches in said rod and an apertured bushing secured to the end of said rod, an elongated body member slidably mounted in said rod and having its lower end extended through the bushing on the end of the rod and secured at its lower end to the pointed tip at the lower end of said standard, interengaging means on the upper end of said body member for engagement with said bushing for limiting upward movement of said rod in said standard, a fork on the upper end of said standard defining a pair of angularly arranged legs, cover members mounted on said legs, a bracket including a back portion secured to the upper end of said standard, a pair of spaced apart flanges extending outwardly from the back portion of said bracket, a spring member supported on a pin extending between said flanges, and said spring member being mounted for movement into and out of engagement with said notches, an apertured ear extending outwardly from the lower portion of said bracket, a ring connected to said ear, and a cable connected to said ring and adapted to be connected to a portion of the fishing rod being supported.

2. In an adjustable fishing rod support, a vertically disposed hollow standard, a pointed tip on the lower end of said standard, a hollow rod adjustably mounted in said standard, there being a plurality of spaced apart notches in said rod and an apertured bushing secured to the end of said rod, an elongated body member slidably mounted in said rod and having its lower end extended through the bushing on the end of the rod and secured at its lower end to the pointed tip at the lower end of said standard, interengaging means on the upper end of said body member for engagement with said bushing for limiting upward movement of said rod in said standard, a fork on the upper end of said standard defining a pair of angularly arranged legs, cover members mounted on said legs, a bracket including a back portion secured to the upper end of said standard, a pair of spaced apart flanges extending outwardly from the back portion of said bracket, a spring member supported on a pin extending between said flanges, and said spring member being mounted for movement into and out of engagement with said notches, an apertured ear extending outwardly from the lower portion of said bracket, a ring connected to said ear, and a cable connected to said ring and adapted to be connected to a portion of the fishing rod being supported, a plate secured to said standard, a horizontally disposed flange on the upper end of said plate, said last named flange adapted to be engaged by a person's foot so as to facilitate projecting the tip down into the ground.

3. In an adjustable fishing rod support, a vertically disposed hollow standard, a pointed tip on the lower end of said standard, a hollow rod adjustably mounted in said standard, there being a plurality of spaced apart notches in said rod and an apertured bushing secured to the end of said rod, an elongated body member slidably mounted in said rod and having its lower end extended through the bushing on the end of the rod and secured at its lower end to the pointed tip at the lower end of said standard, interengaging means on the upper end of said body member for engagement with said bushing for limiting upward movement of said rod in said standard, a fork on the upper end of said standard defining a pair of angularly arranged legs, cover members mounted on said legs, a bracket including a back portion secured to the upper end of said standard, a pair of spaced apart flanges extending outwardly from the back portion of said bracket, a spring member supported on a pin extending between said flanges, and said spring member being mounted for movement into and out of engagement with said notches, an apertured ear extending outwardly from the lower portion of said bracket, a ring connected to said ear, and a cable connected to said ring and adapted to be connected to a portion of the fishing rod being supported, a plate secured to said standard, a horizontally disposed flange on the upper end of said plate, said last named flange adapted to be engaged by a person's foot so as to facilitate projecting the tip down into the ground, and said plate being provided with plurality of teeth thereon.

References Cited in the file of this patent

UNITED STATES PATENTS

| 566,809 | Strong | Sept. 1, 1896 |
| 1,091,491 | Ebur | Mar. 31, 1914 |
| 2,426,881 | Johnson et al. | Sept. 2, 1947 |
| 2,724,569 | Licata | Nov. 22, 1955 |

FOREIGN PATENTS

| 13,052 | Great Britain | Oct. 1, 1884 |
| 29,956 | Australia | Feb. 5, 1932 |